United States Patent
Moon et al.

(10) Patent No.: US 9,548,631 B2
(45) Date of Patent: Jan. 17, 2017

(54) ANTENNA FOR HARVESTING RF ENERGY

(71) Applicant: Electronics and Telecommunications Research Institute, Daejeon (KR)

(72) Inventors: Jung Ick Moon, Daejeon (KR); Seong-Min Kim, Daejeon (KR); In Kui Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 609 days.

(21) Appl. No.: 13/970,833

(22) Filed: Aug. 20, 2013

(65) Prior Publication Data

US 2014/0361629 A1    Dec. 11, 2014

(30) Foreign Application Priority Data

Jun. 5, 2013   (KR) .................. 10-2013-0064610

(51) Int. Cl.
| | | |
|---|---|---|
| *H02J 17/00* | (2006.01) | |
| *H01Q 1/24* | (2006.01) | |
| *H01Q 9/18* | (2006.01) | |
| *H01Q 19/10* | (2006.01) | |
| *H01Q 3/00* | (2006.01) | |

(52) U.S. Cl.
CPC ............ *H02J 17/00* (2013.01); *H01Q 1/248* (2013.01); *H01Q 9/18* (2013.01); *H01Q 19/108* (2013.01)

(58) Field of Classification Search
CPC ...................................... H01Q 3/00

USPC ........................................ 307/147
See application file for complete search history.

(56) References Cited

U.S. PATENT DOCUMENTS

| | | | |
|---|---|---|---|
| 7,528,698 B2 | 5/2009 | Mickle et al. | |
| 2005/0186994 A1 | 8/2005 | Rahmel et al. | |
| 2005/0280596 A1* | 12/2005 | Tang | H01Q 19/106 343/834 |
| 2010/0270967 A1 | 10/2010 | Cho et al. | |
| 2011/0248903 A1 | 10/2011 | Blick et al. | |

FOREIGN PATENT DOCUMENTS

| | | |
|---|---|---|
| KR | 1020100118383 A | 11/2010 |
| KR | 1020100124368 A | 11/2010 |

OTHER PUBLICATIONS

Lam Siu et al., "Unidirectional Antenna With Loaded Dielectric Substrate", IEEE Antennas and Wireless Propagation Letters, 2008, pp. 50-53, vol. 7, IEEE.
Jung-Ick Moon et al., "Novel Rectenna Using Modified Ground Plane for RF Energy Harvesting", PIERS Draft Proceedings, Aug. 12-15, 2013, pp. 1775-1777, Stockholm, Sweden.

* cited by examiner

*Primary Examiner* — Robert Deberadinis
(74) *Attorney, Agent, or Firm* — William Park & Associates Ltd.

(57) ABSTRACT

An antenna for harvesting RF energy includes a radiator; and a ground plane onto which the radiator is supported. Further, the antenna includes a vertical ground plane that is formed on the ground plane in a direction parallel to the radiator at a location spaced by a predetermined distance from the radiator.

9 Claims, 16 Drawing Sheets

ANTENNA FOR HARVESTING RF ENERGY

CROSS-REFERENCE TO RELATED APPLICATION(S)

The present invention claims priority of Korean Patent Application No. 10-2013-0064610, filed on Jun. 5, 2013, which is incorporated herein by reference.

FIELD OF THE INVENTION

The present invention relates to an energy harvesting apparatus, and more particularly, to an antenna for harvesting RF (Radio Frequency) energy, which is capable of utilizing back radiation of a high-gain, high-power antenna in renewing the RF energy to efficiently renew the RF energy and harvesting unwanted back radiation energy for utilization in the antenna without lowering the radiation performance of the high-gain antenna.

BACKGROUND OF THE INVENTION

In recent years, for securing energy resources of the future, various countries of the world are studying about a variety of energy sources that can be obtained easily from the natural to make use of the energy sources, and some developed countries in energy utilization including South Korea take advantage of the variety of energy sources as the main auxiliary power generation system for the power supply in their countries.

Energy sources available for an energy renewal may include (solar) light, heat, vibration source as well as an RF energy source, etc. Among them, the RF source utilizes the fact that radio waves from base stations or repeaters are propagated over space for wireless communication and its application is limited because of having a power per unit area of about 0.1 $\mu W/cm^2$, which is extremely very low 1/1,000 to 1/10,000 times as compared to other energy sources. In the case of a sensor that is one of representative applications utilizing an energy renewal, its power consumption becomes at most 50 $\mu W$~50 mW and, therefore, its utility decreases in RF energy renewal techniques.

Further, as the efficiency of a rectenna depends on the magnitude of the RF energy received, the lower the reception power is, the efficiency of a receiver circuit is rapidly decreases, and the larger the fluctuation of the received power is, the insufficient amount of energy becomes charged. In spite of that, the amount of RF energy that is being propagated into the atmosphere for the purpose of mobile communications is considerable as compared to the harvestable amount of power per unit area. Therefore, if a beneficial technology is developed to use the RF energy as a renewable energy source not to render the RF energy to be extinguished naturally, its value is inexhaustible.

On the other hand, a high-power RF energy source may be antennas of repeaters, base stations or the like in our daily lives. However, a technique for utilizing the RF energy was nothing but the collection of energy radiated from the repeaters and the base stations using rectennas disposed adjacent to the antennas. In such a case, it is possible to design the rectennas to have the frequency similar to the resonant frequency in order to increase the collection amount of energy by the rectennas. However, it has a problem that energy generated originally from an existing antenna is deflected in a direction where a rectenna is disposed due to a strong mutual coupling between the antenna and the rectenna to deteriorate the performance of the antenna, which results in fading the original purpose of the renewable energy.

Therefore, there are needs to provide a technology for renewing RF energy efficiently without impairing the intrinsic performance of the existing antenna and a technology for utilizing to renew the radiation component which is wasted unnecessarily from a high-power energy source with a relatively high power density when renewing the RF energy.

SUMMARY OF THE INVENTION

In view of the above, the present invention provides an antenna for harvesting RF energy and an RF energy harvesting apparatus, capable of utilizing back radiation of a high-gain, high-power antenna in renewing the RF energy to efficiently renew the RF energy and harvesting unwanted back radiation energy for utilization in the antenna without lowering the radiation performance of the high-gain antenna.

In accordance with a first aspect of the present invention, there is provided an antenna for harvesting RF energy. The antenna includes a radiator; a ground plane onto which the radiator is supported; and a vertical ground plane that is formed on the ground plane in a direction parallel to the radiator at a location spaced by a predetermined distance from the radiator.

Further, the radiator may be formed in the type of a horizontal dipole.

Further, the vertical ground plane may be formed one on each side of the radiator or both sides of the radiator.

Further, the vertical ground plane may have a slot at its center to control a coupling coefficient between the radiator and the vertical ground plane.

Further, the vertical ground plane may have a coaxial cable attached thereto, which is configured to deliver energy obtained get from the vertical ground plane to a receiving circuit.

Further, the ground plane may have a shape of a circle, and the vertical ground plane is formed in the shape of a circle to cope with the shape of the ground plane.

In accordance with a second aspect of the present invention, there is provided an antenna for harvesting RF energy. The antenna includes a radiator; a ground plane onto which the radiator is supported; a first vertical ground plane that is formed on the ground plane in a direction parallel to the radiator at a location spaced by a predetermined distance from the radiator; and a second vertical ground plane that is formed on the ground plane in a direction perpendicular to the radiator, the second vertical ground plane being coupled to the first vertical ground plane.

Further, the antenna may further comprise a third vertical ground plane that is formed on the ground plane in a direction parallel to the radiator at a location spaced by a predetermined distance from the first ground plane, and the third vertical plane may be extended at its both ends in a direction perpendicular to the first ground plane to couple with the second vertical ground plane.

In accordance with an embodiment of the present invention, an antenna and an apparatus for harvesting RF energy have merit in that it is possible to efficiently renew the RF energy and harvest unwanted back radiation energy for utilization from a high-gain, high-power antenna without deteriorating reducing the radiated performance of the high-gain antenna by using the back radiation of the antenna in renewing the RF energy.

BRIEF DESCRIPTION OF THE DRAWINGS

The above and other objects and features of the present invention will become apparent from the following description of the embodiments given in conjunction with the accompanying drawings, in which.

DETAILED DESCRIPTION OF THE EMBODIMENTS

Figure 1:
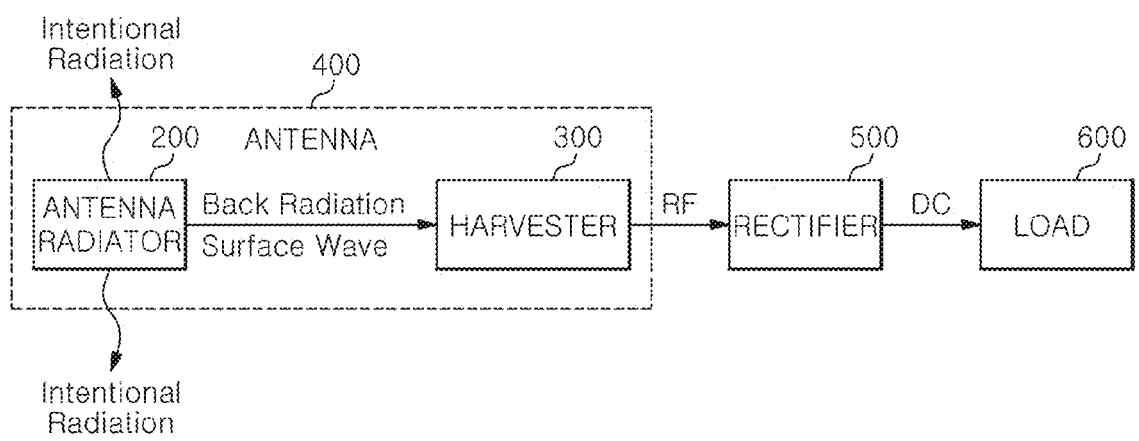
FIG. 1 is a block diagram of an RF energy harvesting apparatus with an antenna capable of harvesting RF energy in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, the embodiments of the present invention will be described in detail with reference to the accompanying drawings.

FIG. 1 is a block diagram of an RF energy harvesting apparatus in accordance with an embodiment of the present invention. The RF energy harvesting apparatus includes an antenna 400, a rectifier 500 and a load 600.

Hereinafter, the operation of the respective components of the RF energy harvesting apparatus will be described with reference to FIG. 1.

First, the antenna 400 includes an antenna radiator 200 to radiate RF energy and a harvester 300 disposed to harvest a part of the RF energy radiated backward of the antenna radiator 200.

The rectifier 500 rectifies the RF energy harvested by the antenna 400 to generate an energy source and supplies the energy source to a variety of the loads 600 that are necessary the energy source.

Figure 3:
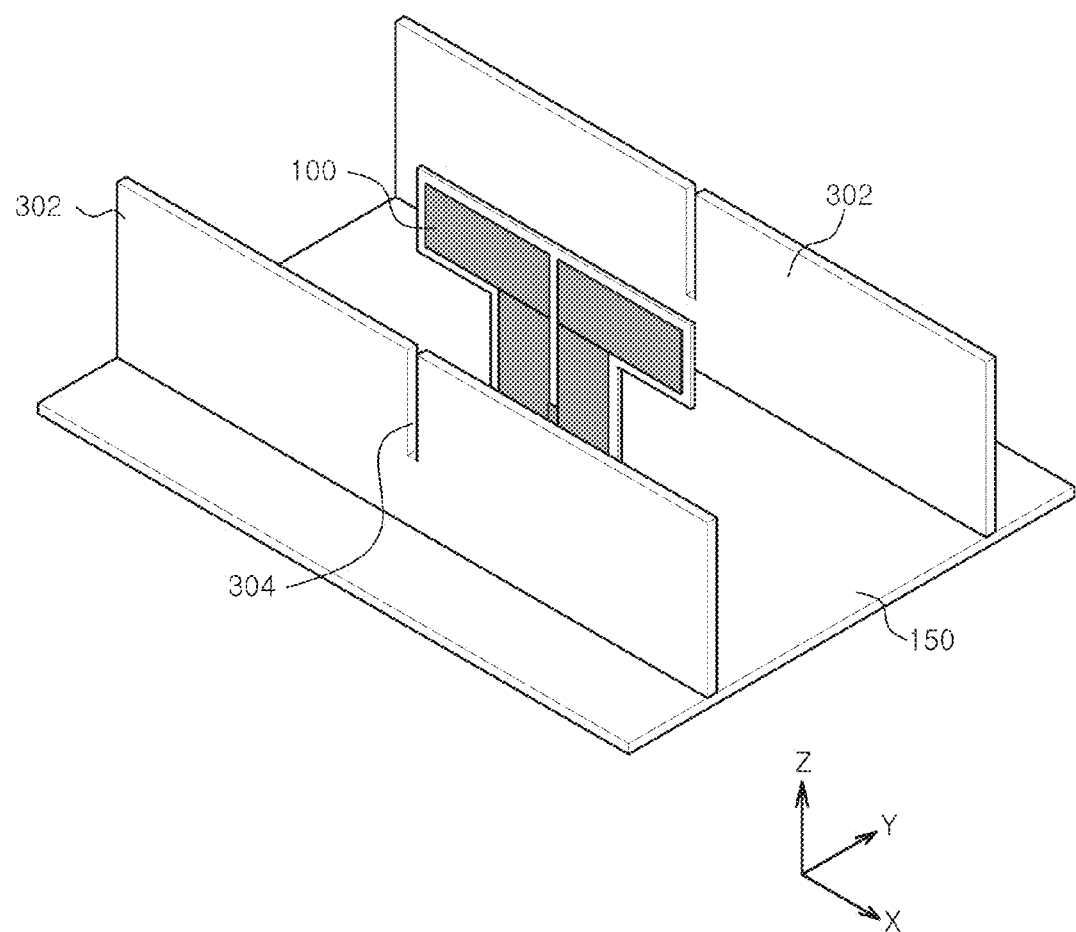
FIG. 3 illustrates a diagram of a model for an antenna capable of harvesting RF energy in accordance with an embodiment of the present invention.

The antenna 400 may be installed in a base station or a repeater. Further, the antenna 400 in accordance with an embodiment of the present invention refers to an antenna that is designed to have supplementary vertical ground planes 302, which are operable as the harvester 300 capable of harvesting the RF energy, in addition to the antenna radiator 200, thereby enhancing a renewal efficiency of the RF energy. As illustrated in FIG. 3, the harvester 300 may be composed of the vertical ground planes 302.

Figure 2:
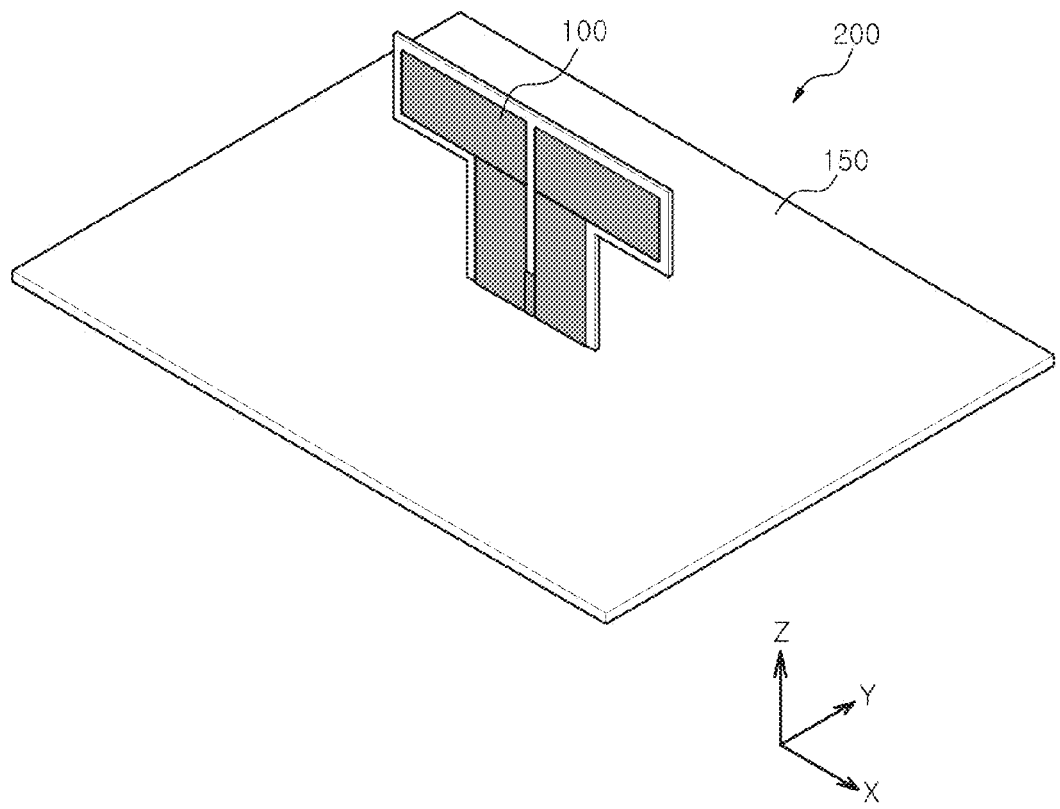
FIG. 2 illustrates a diagram of a model for an antenna in accordance with a prior art.

In general, a conventional antenna employed in a base station is made in a single device which constitutes an array antenna or the like in the base station and has an antenna radiator 100 in the type of a horizontal dipole on a ground plane 150 to exhibit high-gain, high-power characteristic. However, the antenna illustrated in FIG. 2 is mainly constructed with only the antenna radiator 100 and has a difficult to harvest a part of the RF energy radiated backward of the radiator 100, which leads to a low renewal efficiency of the RF energy.

That is, the conventional high-gain, high-power antenna has the antenna radiator 100 in the type of a horizontal dipole on the ground plane 150, which is made in a single device constituting an array antenna employed in the base stations. In addition, the antenna has an operating frequency range of 2.11~2.17 GHz, a radiation gain 8.5 dBi, and a FBR (Front Back Ratio) of a radiation pattern of 817.2 dB.

In view of the above, in order to more efficiently renew the RF energy being radiated from the radiator 100 in the antenna 400, the embodiment of the present invention forms various types of vertical ground plane to facilitate the harvest of the RF energy around the radiator 100 so that the antenna can efficiently harvest the RF energy being radiated in all directions to achieve a high renewal efficiency of the RF energy.

FIG. 3 illustrates a high-gain, high-power antenna in accordance with an embodiment of the present invention.

As illustrated in FIG. 3, the embodiment of the present invention additionally includes vertical ground planes 302 that are vertically arranged in a parallel direction with the radiator 100 in comparison to the conventional antenna illustrated in FIG. 2.

Each of the vertical ground planes 302 has a slot 304 in its center that controls a coupling coefficient between the radiator 100 and the vertical ground planes 302. In addition, as illustrated in FIG. 4, a coaxial cable, which is composed of an inner conductor 306 and an outer conductor 308 is attached to an upper end of the vertical ground plane 302 to deliver the energy obtained by the vertical ground plane 302 to a recipient circuit or the rectifier 500.

Figure 4:
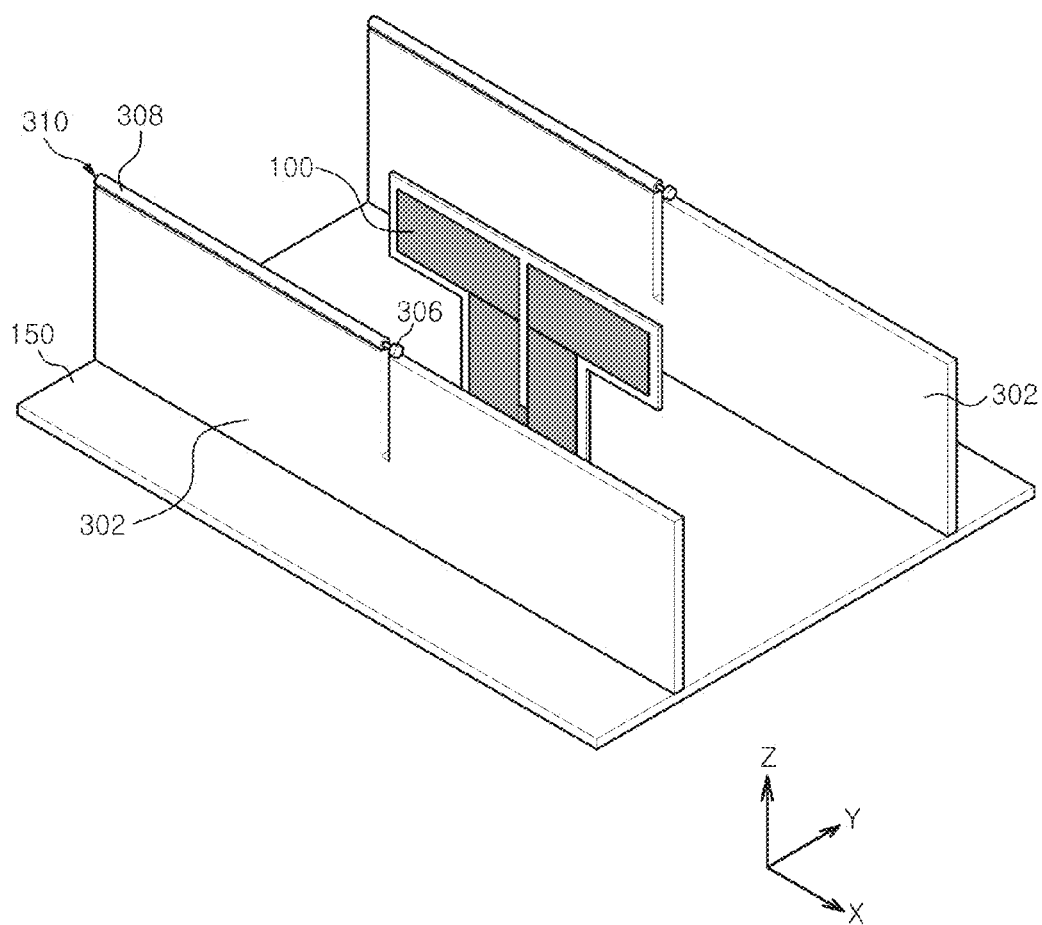
FIG. 4 is an exemplary diagram of a model for an antenna with a coaxial cable attached thereon in accordance with an embodiment of the present invention.
Figure 5:
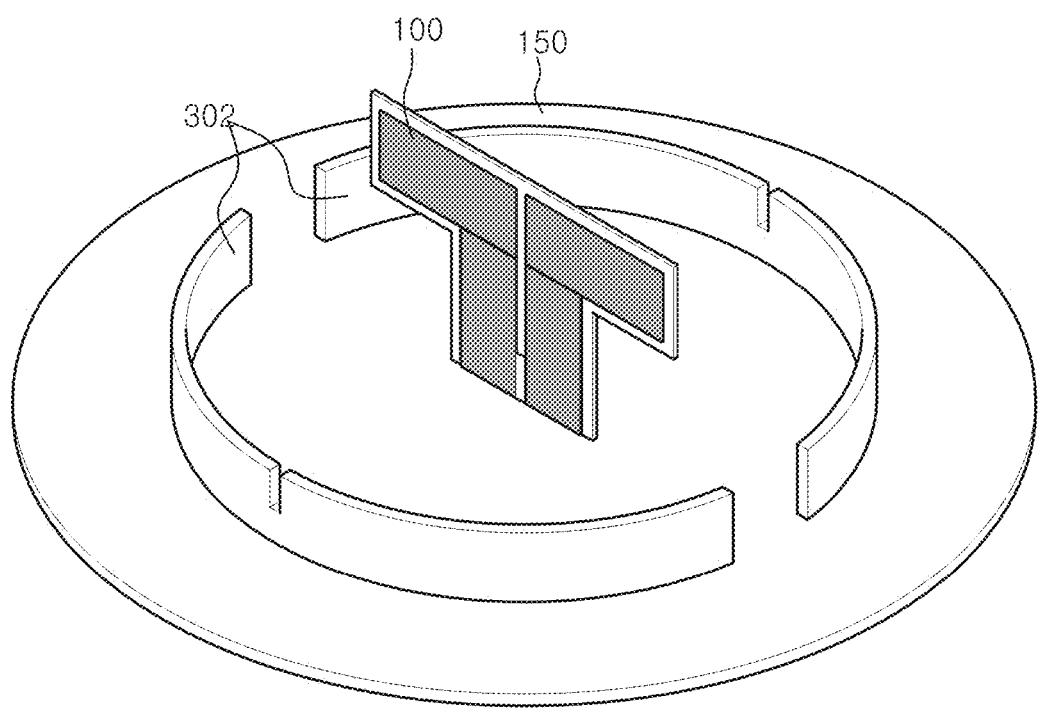
FIG. 5 illustrates a diagram of a model for an antenna capable of harvesting RF energy in accordance with another embodiment of the present invention.

FIG. 5 shows a variation of the vertical ground planes illustrated in FIG. 4, which has vertical circle ground planes 302 to harvest RF energy applied to a ground plane 150 in the shape of a circle. As illustrated in FIG. 5, even though the ground plane 150 takes a shape of a circle, the supplementary vertical ground planes 302 needs not necessarily to take a circle having the same diameter as the circular ground plane 150 and is enough to be a circular conductor.

Figure 6:
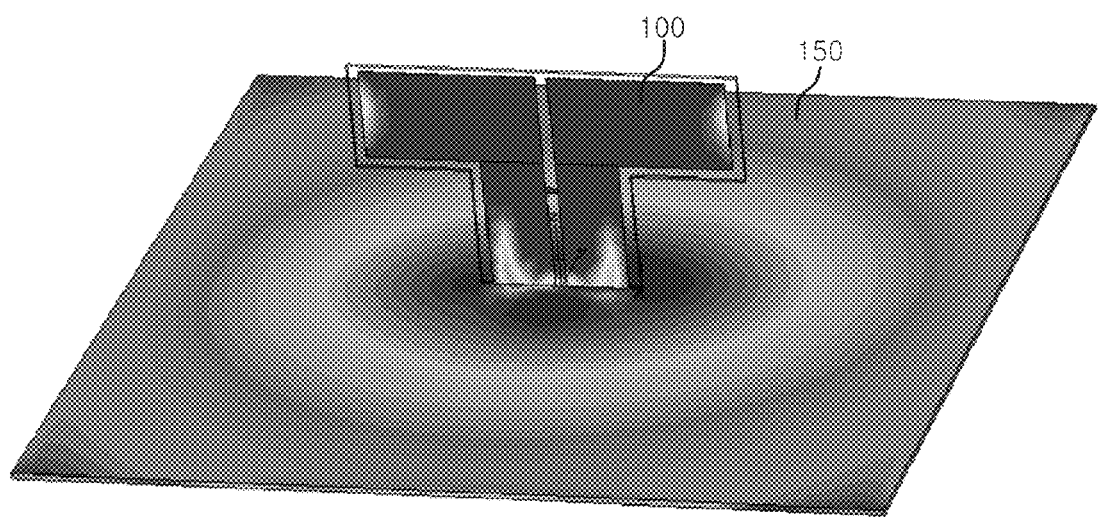
FIG. 6 is an exemplary diagram of depicting the distribution of current flowing on a ground plane of the antenna model shown in FIG. 2.

Meanwhile, the antenna radiator 100 in the conventional high-gain antenna has a characteristic to radiate RF energy over the ground plane 150 (in +z-axis direction). However, since the ground plane 150 constituting the antenna has a finite size, as illustrated in FIGS. 7A and 7B, a substantial amount of the RF energy is radiated at the sides (in (.+-.) x-axis direction and (.+-.) y-axis direction) and backward (in (-) z-axis direction) of the ground plane 150 owing to a surface current flowing along the ground plane as shown in FIG. 6.

Figure 8:
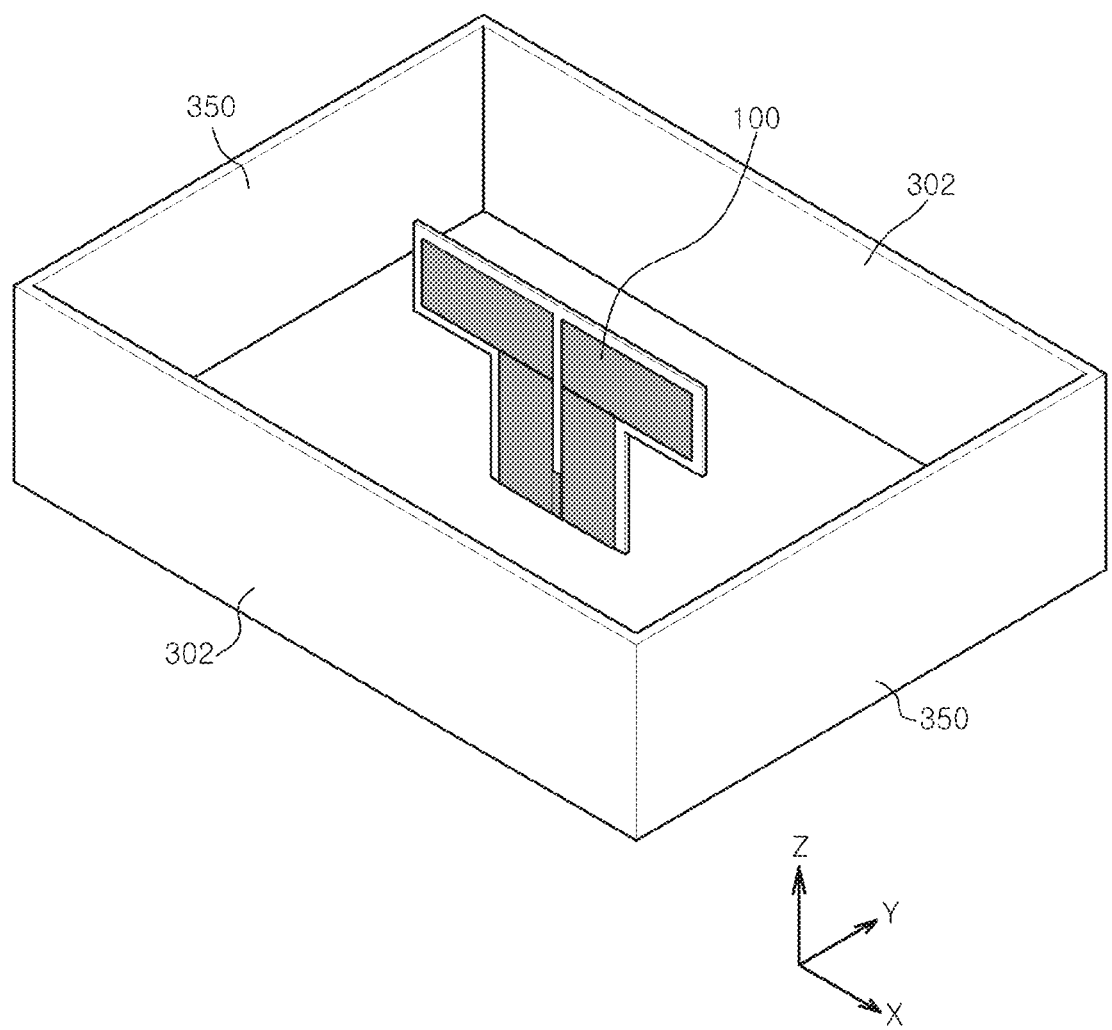
FIG. 8 illustrates a model for an antenna capable of harvesting RF energy with an additional ground plane additionally added.
Figure 10:
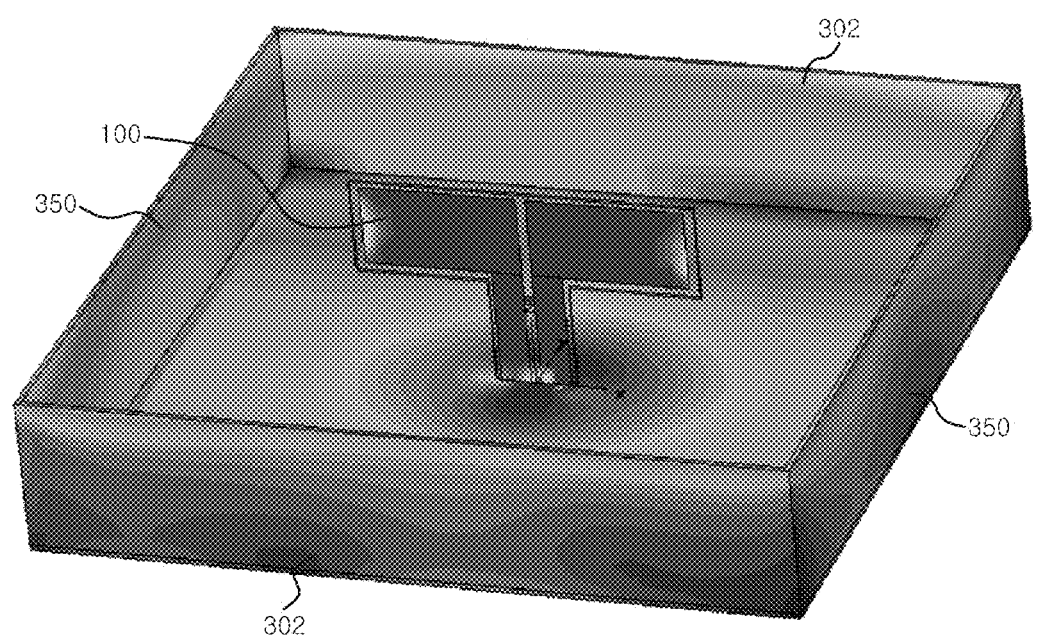
FIG. 10 is an exemplary diagram of depicting the distribution of current flowing on a vertical ground plane of the antenna model shown in FIG. 8.

The RF energy radiated backward of the ground plane is an unintentional component in the high-gain antenna installed in the base station, which causes lowering the radiation gain and causes a radio wave interference in surrounding antennas and devices. Therefore, in order to lower the back radiation while raising a front radiation, such a vertical ground plane is additionally constructed to have about ¼ of a wavelength in height at the corners of the ground plane as illustrated in FIG. 8 and FIG. 10.

Figure 7A:
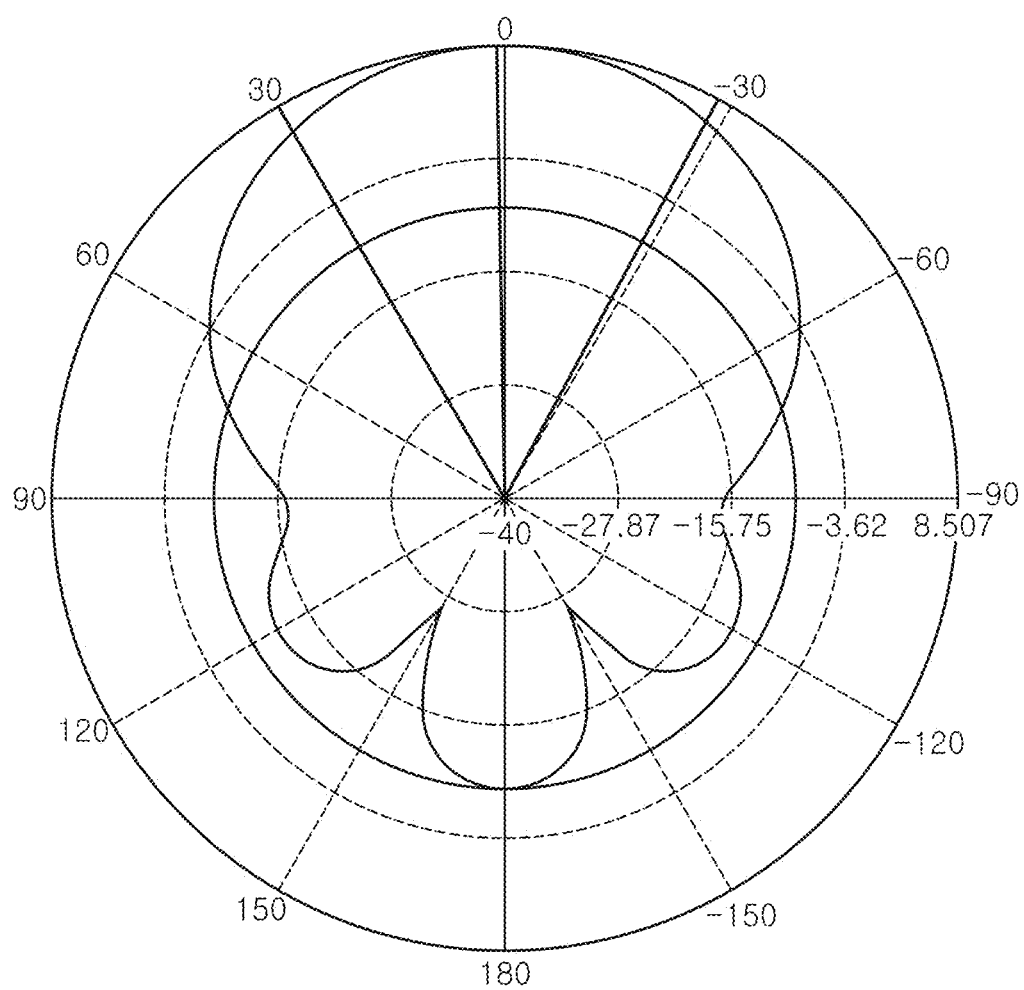
FIGS. 7A and 7B illustrate a radiation pattern graph for the antenna model shown in FIG. 2.
Figure 7B:
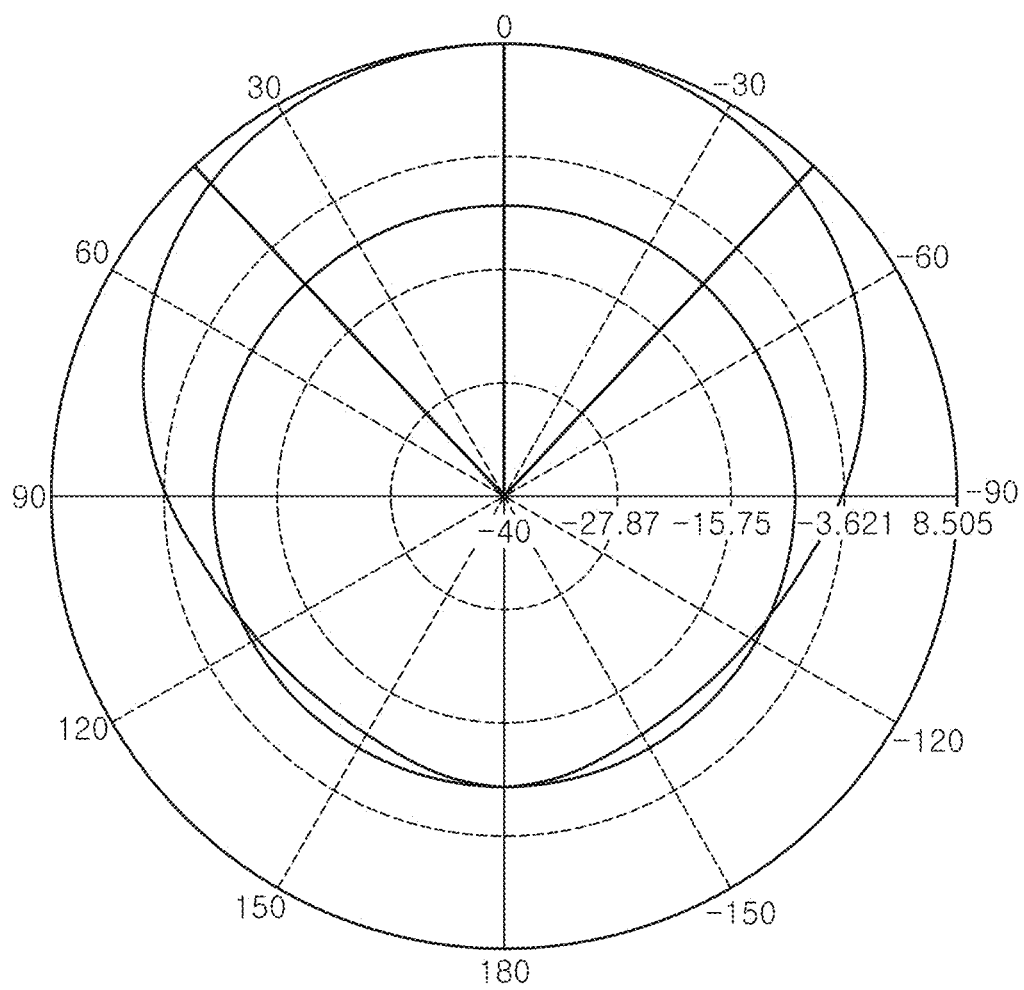
Figure 9A:
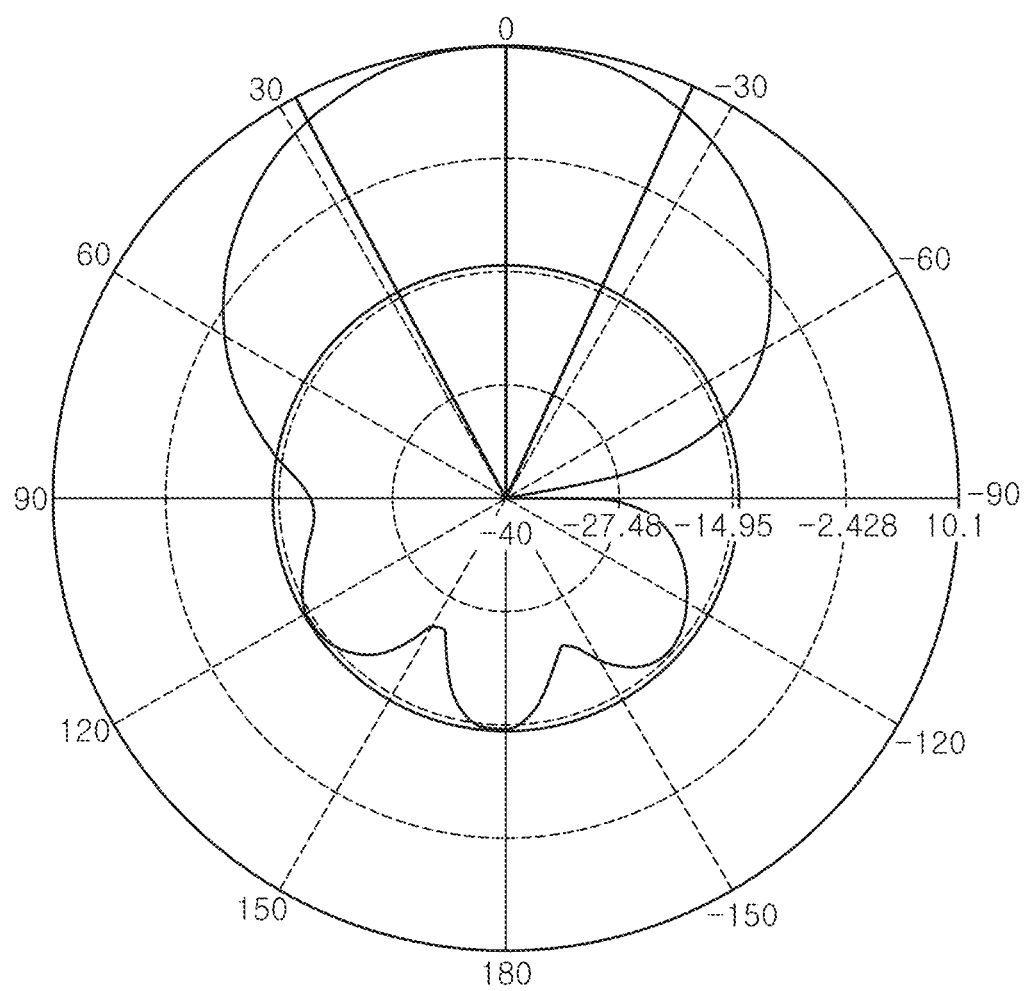
FIGS. 9A and 9B illustrate a radiation pattern graph for the antenna model shown in FIG. 8.
Figure 9B:
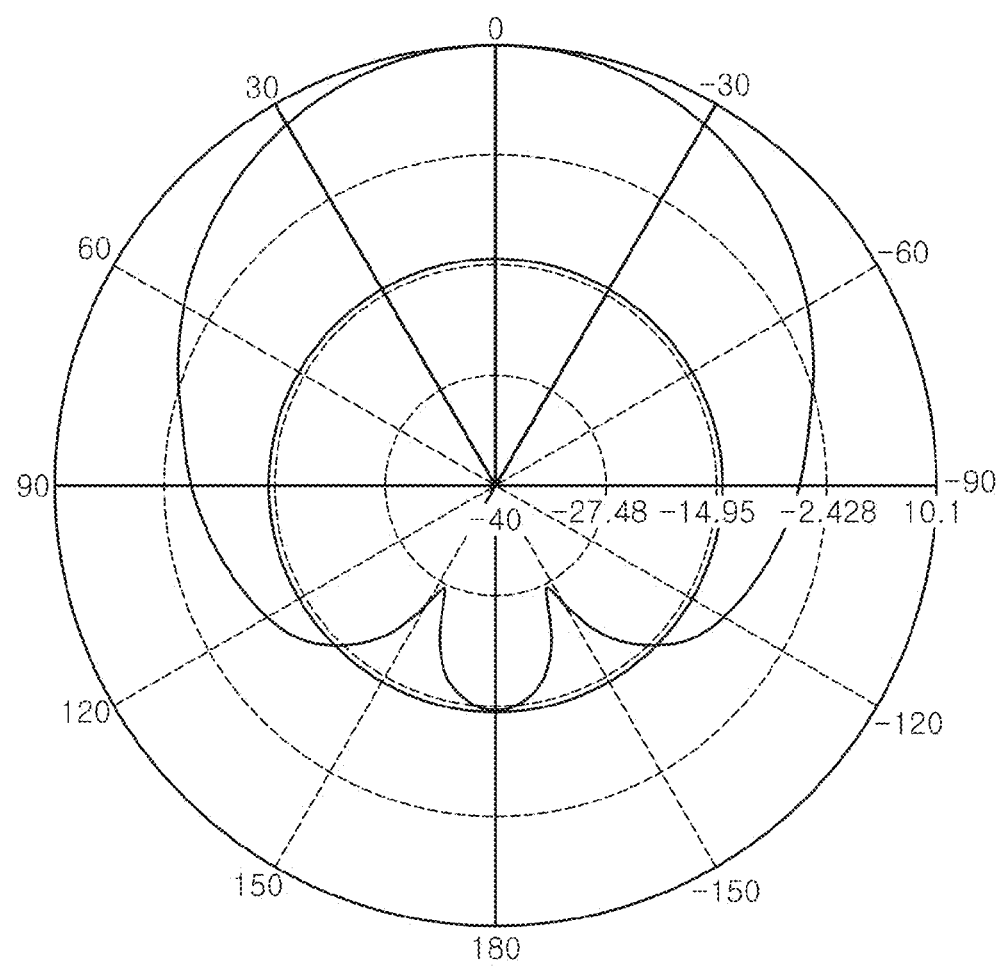

FIGS. 9A and 9B illustrate improved radiation characteristics as compared to that of FIGS. 7A and 7B, where a beam width is reduced by about 5°, and a backward radiation is reduced by about 8 dB, and a radiation gain is increased by about 1.6 dBi. These are achieved by an appliance of the principle that takes over an effect of an array antenna with a high gain by directing the current flowing on the ground plane 150 of the antenna radiator 200 to vertical ground planes 302 and 350.

However, it is not possible that the vertical ground planes 302 and 350 of the high-gain antenna can be always added in accordance with the mount environment of the antenna and the arrangement of surrounding radiator elements. In addition, since the edges of the ground plane are used for the vertical ground planes, the overall volume of the antenna may be increased and there may also occur a case where mounting brackets fixing the antenna need to be deformed. Therefore, if the high-gain, high-power antenna is designed to have a capability of not only renewing the radiation energy otherwise to be extinguished backward of the ground plane, but also improving an existing radiation performance while maintaining the size of the ground plane of the antenna by using the space between the radiator 100 and the ground plane 150, and utilizing the renewal energy in a variety of applications (e.g., a power for a sensor to observe the state of the antenna, etc.), it would be useful to operate the antenna installed in the base station or repeater.

Therefore, based on the design as set forth above, the embodiment of the present invention suggests a model for a high-gain, high-power antenna capable of utilizing current flowing on the vertical ground planes 302 shown in FIG. 3 as an energy source to maintain or enhance the antenna performance and renew RF energy radiated backward of the antenna.

To put it another way, the antenna model of FIG. 3 is obtained by additionally providing it with vertical ground planes 302 that are formed vertically between the ground plane 150 and the radiator 100 in the antenna model shown in FIG. 2. The vertical ground planes 302 may be constructed by adding the vertical ground planes 302, 350 along four sides of the ground plane 150 in the form of a rectangle or may be formed by the vertical ground planes 302 that are horizontally parallel to the direction of current flowing in the antenna radiator (i.e., x-axis direction) as shown in FIG. 3.

Meanwhile, the vertical ground planes 302 that are parallel to the x-axis direction is able to obtain a better effect over the vertical ground planes 350 that are parallel to a y-axis direction in terms of the improvement of radiation performance. Further, it is possible to realize an RF energy harvesting apparatus using different vertical ground planes depending on the shape of the ground plane 150 as shown in FIG. 2.

Figure 11:
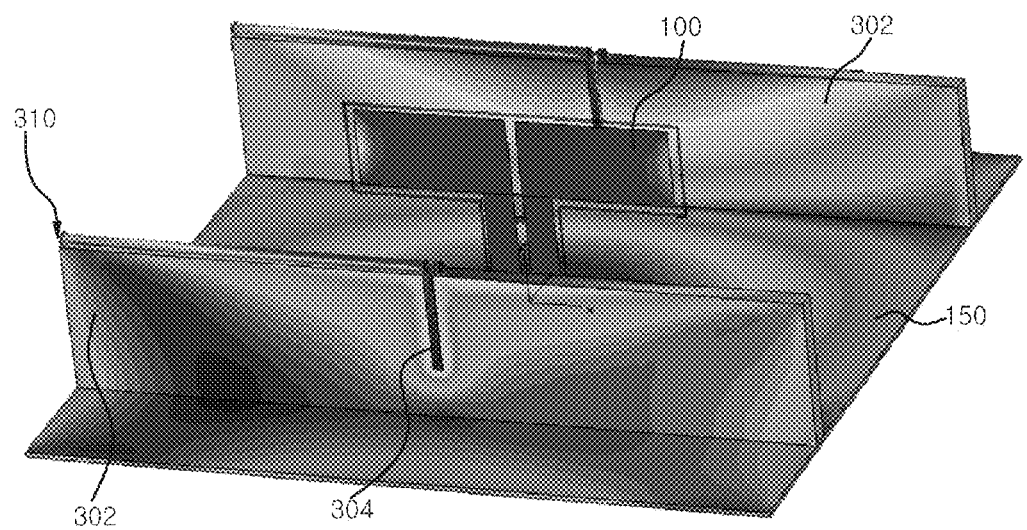
FIG. 11 is an exemplary diagram of depicting the distribution of current flowing on a vertical ground plane of the antenna model shown in FIG. 3.

FIG. 11 depicts the distribution of current flowing on a vertical ground plane 302 of the high-gain antenna model shown in FIG. 3.

As depicted in FIG. 11, a harvesting conductive wire such as a coaxial cable 310 is attached to an upper edge of the vertical ground planes 302 so that the maximum amount of current can be harvested from the supplementary vertical ground planes 302. The slot 304 located in a middle of the vertical ground planes used to control a coupling coefficient between the radiator 100 and the vertical ground planes 302. The coupling coefficient increases in proportion to the depth (in z-axis direction) of the slot 304.

Figure 12A:
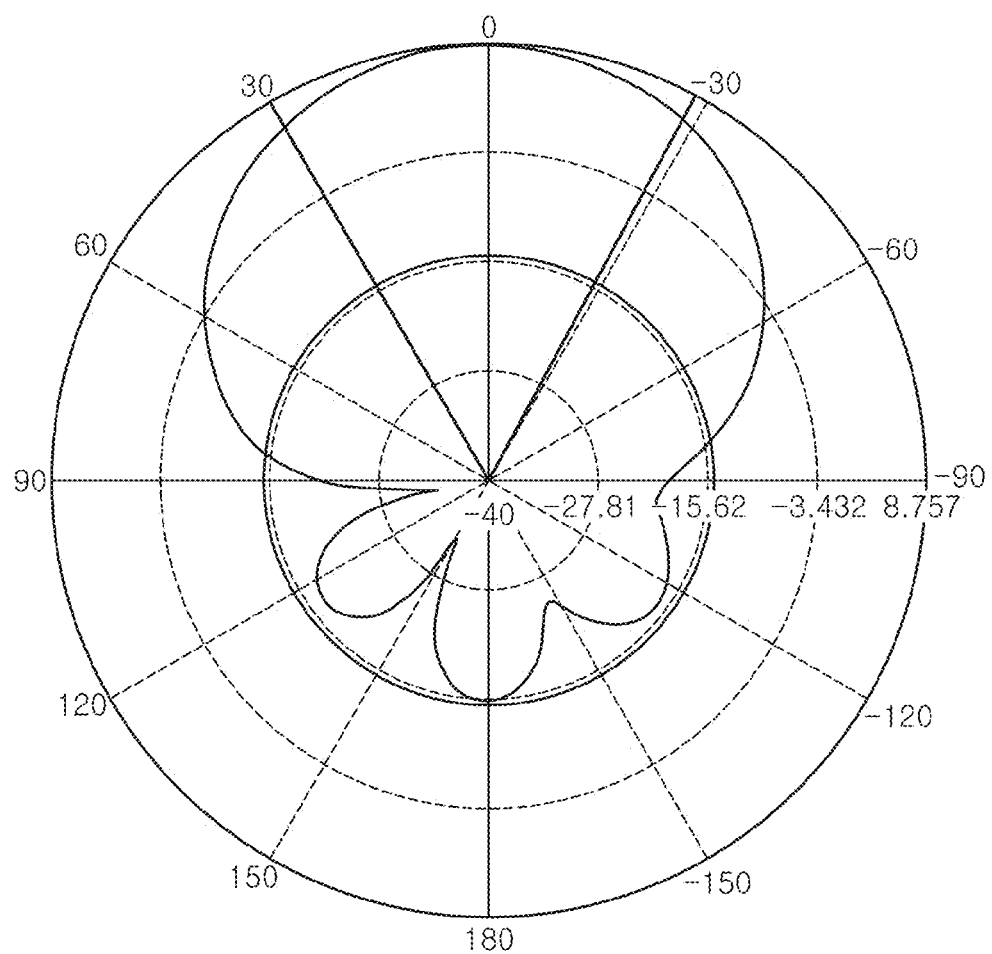
FIGS. 12A and 12B illustrate a radiation pattern graph for the antenna model shown in FIG. 3.
Figure 12B:
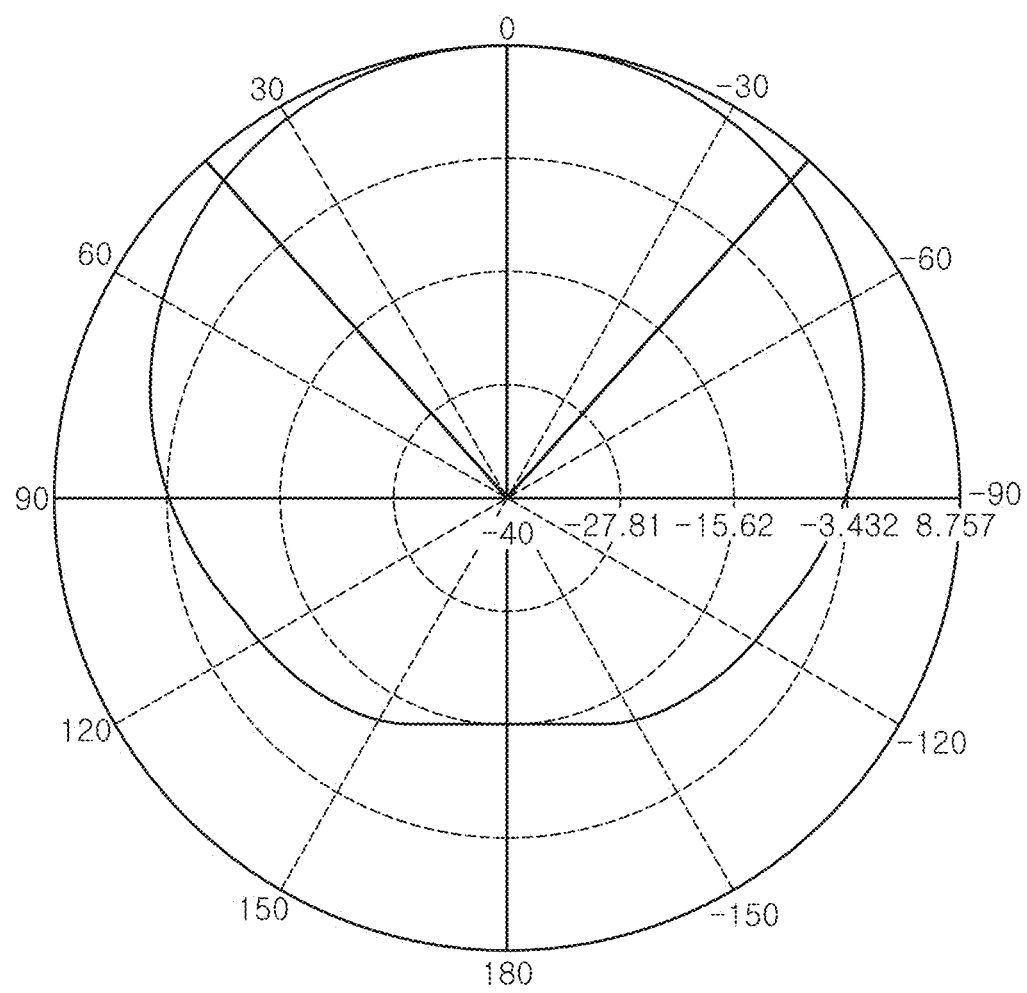

FIGS. 12A and 12B illustrate a radiation pattern for the antenna model shown in FIG. 3. As known from FIG. 12A and 12B, the back radiation is improved as compared to that illustrated in FIGS. 7A and 7B.

Following TABLE 1 shows characteristic changes in the antenna when a position of a power receiving point (a contact point between an inner conductor of the coaxial cable and the ground plane) and a slot 304 is moved in a (-) x-axis direction, and the calculated results in the TABLE 1 indicate that a designer can optimize the RF energy to be harvested.

TABLE 1

|  | Middle of Ground Plane | 20 mm movement in (-) x-axis | 40 mm movement in (-) x-axis | 60 mm movement in (-) x-axis |
| --- | --- | --- | --- | --- |
| Operating frequency range [GHz] (Criterion of reflection loss, 15 dB) | 2.04~2.24 | Same as left | Same as left | Same as left |
| Center frequency [GHz] | 2.14 | Same as left | Same as left | Same as left |
| Radiation gain [dBi] | 8.75 | 8.80 | 8.81 | 8.83 |
| FBR (Front Back Ratio) | 24.0 | 24.4 | 25.4 | 25.4 |
| Extend of energy renewal | 1/100 as compared to an antenna output | 1/125 as compared to an antenna output | 1/250 as compared to an antenna output | 1/1000 as compared to an antenna output |

Following TABLE 2 represents the performance comparison between the inventive antenna model shown in FIG. 3 and the existing antenna model shown in FIG. 2.

TABLE 2

|  | Existing antenna (FIG. 2) | Inventive Antenna (FIG. 3) | Remarks |
| --- | --- | --- | --- |
| Operating | 2.08~2.43 | 2.04~2.24 | It satisfies the |

TABLE 2-continued

|  | Existing antenna (FIG. 2) | Inventive Antenna (FIG. 3) | Remarks |
|---|---|---|---|
| frequency range [GHz] (Criterion of reflection loss, 15 dB) |  |  | operating frequency range of WCDMA antennas (2.11~2.17 GHz). Thus, it maintains existing performance. |
| Center frequency [GHz] | 2.24 | 2.14 | It is possible to miniaturize because of the downward of center frequency. |
| Radiation gain [dBi] | 8.5 | 8.75 | Improvement of performance |
| FBR (Front Back Ratio) [dB] | 17.2 | 24.0 | Improvement of performance (about 5 times). |
| Beam width (xz-plane, yz-plane) [deg] | 58.0(E), 86.7(H) | 57.7(E), 84.1(H) | Improvement of performance |
| Extent of energy renewal | N/C | 1/200 as compared to an antenna output | Assuming that the antenna output of a base station is 20 W, it has a renewal effect of about 100 mW |

Figure 13:
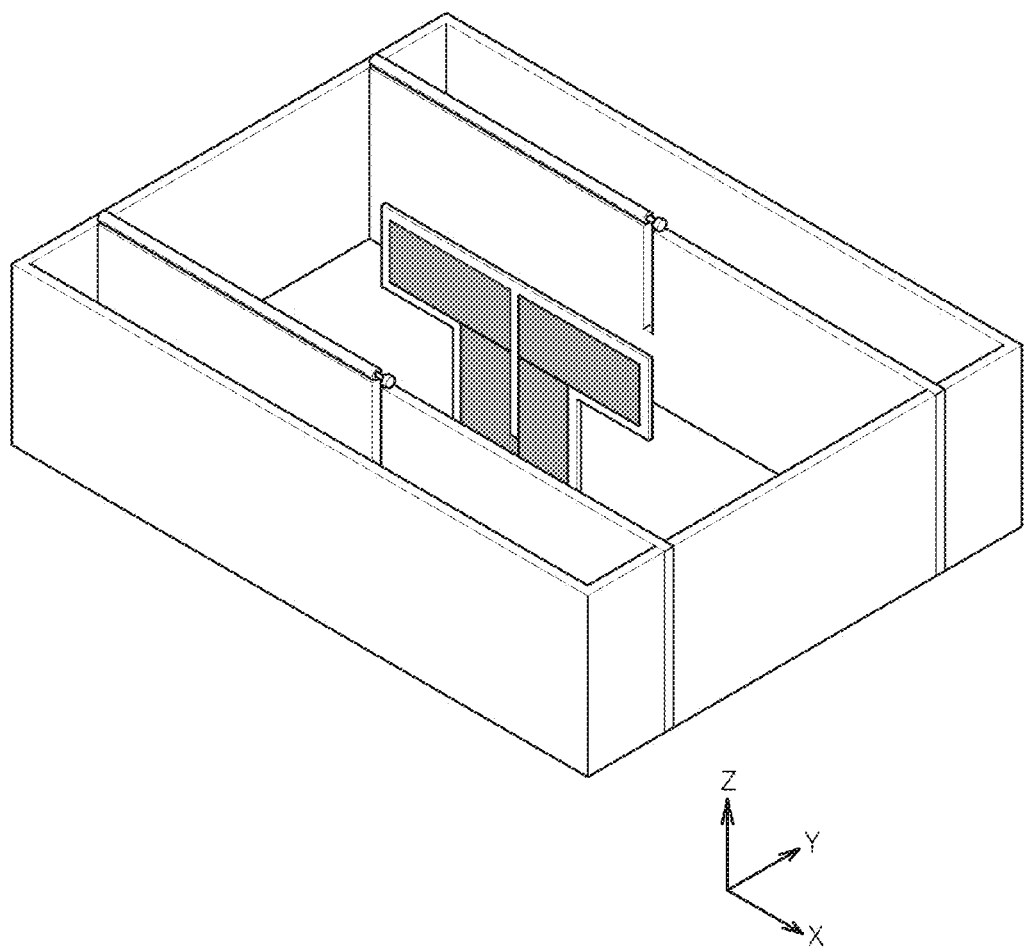
FIG. 13 illustrates an antenna model into which two models shown in FIGS. 4 and 8 are combined.

FIG. 13 illustrates an antenna model into which two models shown in FIGS. 3 and 8 are combined.

As can be seen from TABLE 3, the antenna model suggested in FIG. 13 still maintains the resonant frequency characteristic as compared to that suggested in FIG. 3, exhibits an improvement of 0.9 dBi in a radiation gain and an improvement of 1.8 dB in FBR. Accordingly, the antenna model suggested in FIG. 13 is also applicable as a high-gain, high-power antenna model capable of renewing RF energy.

TABLE 3

|  | Existing antenna (FIG. 2) | Inventive antenna (FIG. 3) | Inventive antenna (FIG. 13) |
|---|---|---|---|
| Operating frequency range [GHz] (Criterion of reflection loss, 15 dB) | 2.08~2.43 | 2.04~2.24 | 2.04~2.24 |
| Center frequency [GHz] | 2.24 | 2.14 | 2.14 |
| Radiation gain [dBi] | 8.5 | 8.75 | 9.65 |
| FBR (Front Back Ratio) [dB] | 17.2 | 24.0 | 25.8 |
| Beam width (xz-plane, yz-plane) [deg] | 58.0(E), 86.7(H) | 57.7(E), 84.1(H) | 52.7(E), 70.7(H) |
| Extent of energy renewal | N/C | 1/100 as compared to an antenna output | 1/160 as compared to an antenna output |

As set forth above, in accordance with an embodiment of the present invention, an antenna for harvesting RF energy and an RF energy harvesting apparatus utilize the back radiation of a high-gain, high-power antenna in renewing the RF energy to allow the efficient renewal of the RF energy and the harvest of unintentional back radiation energy for utilization without deteriorating reducing the radiation performance of the high-gain antenna.

While the invention has been shown and described with respect to the embodiments, the present invention is not limited thereto. It will be understood by those skilled in the art that various changes and modifications may be made without departing from the scope of the invention as defined in the following claims.

What is claimed is:

1. An antenna for harvesting RF energy, the antenna comprising:
   a radiator;
   a ground plane onto which the radiator is supported;
   a vertical ground plane that is formed on the ground plane in a direction parallel to the radiator at a location spaced by a predetermined distance from the radiator, and
   a coaxial cable mounted on an edge of the vertical ground plane.

2. The antenna of claim 1, wherein the radiator is formed in the type of a horizontal dipole.

3. The antenna of claim 1, wherein the coaxial cable configured to deliver energy obtained from the vertical ground plane to a receiving circuit.

4. An antenna for harvesting RF energy, the antenna comprising:
   a radiator;
   a ground plane onto which the radiator is supported; and
   a vertical ground plane that is formed on the ground plane in a direction parallel to the radiator at a location spaced by a predetermined distance from the radiator,
   wherein the vertical ground plane has a slot at its center to control a coupling coefficient between the radiator and the vertical ground plane.

5. An antenna for harvesting RF energy, the antenna comprising:
   a radiator;
   a ground plane onto which the radiator is supported; and
   a vertical ground plane that is formed on the ground plane in a direction parallel to the radiator at a location spaced by a predetermined distance from the radiator,
   wherein the vertical ground plane is formed one on each side of the radiator or both sides of the radiator.

6. An antenna for harvesting RF energy, the antenna comprising:
   a radiator;
   a ground plane onto which the radiator is supported; and
   a vertical ground plane that is formed on the ground plane in a direction parallel to the radiator at a location spaced by a predetermined distance from the radiator,
   wherein the ground plane has a shape of a circle, and the vertical ground plane is formed in the shape of a circle to cope with the shape of the ground plane.

7. An antenna for harvesting RF energy, the antenna comprising:
   a radiator;
   a ground plane onto which the radiator is supported;
   a first vertical ground plane that is formed on the ground plane in a direction parallel to the radiator at a location spaced by a predetermined distance from the radiator;
   a second vertical ground plane that is formed on the ground plane in a direction perpendicular to the radiator, the second vertical ground plane being coupled to the first vertical ground plane, and
   a coaxial cable mounted on an edge of the first vertical ground plane.

8. The antenna of claim 7, wherein the coaxial cable configured to deliver energy obtained from the first vertical ground plane to a receiving circuit.

9. An antenna for harvesting RF energy, the antenna comprising:
- a radiator;
- a ground plane onto which the radiator is supported;
- a first vertical ground plane that is formed on the ground plane in a direction parallel to the radiator at a location spaced by a predetermined distance from the radiator;
- a second vertical ground plane that is formed on the ground plane in a direction perpendicular to the radiator, the second vertical ground plane being coupled to the first vertical ground plane; and
- a third vertical ground plane that is formed on the ground plane in a direction parallel to the radiator at a location spaced by a predetermined distance from the first ground plane,
- wherein the third vertical plane is extended at its both ends in a direction perpendicular to the first ground plane to couple with the second vertical ground plane.

* * * * *